July 24, 1928.
C. S. WEYANDT
1,678,278
RECIPROCATING ELECTRIC MOTOR
Filed May 2, 1924 2 Sheets-Sheet 1
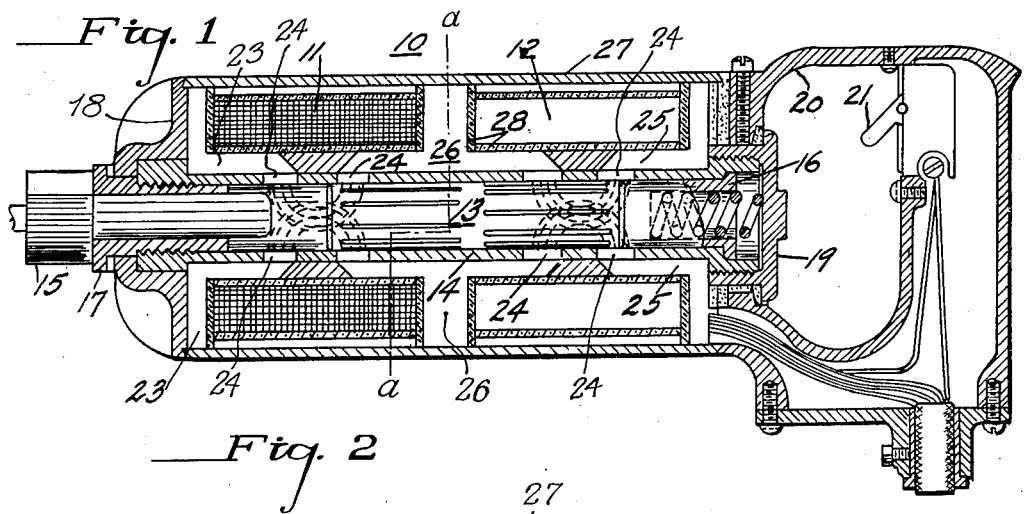
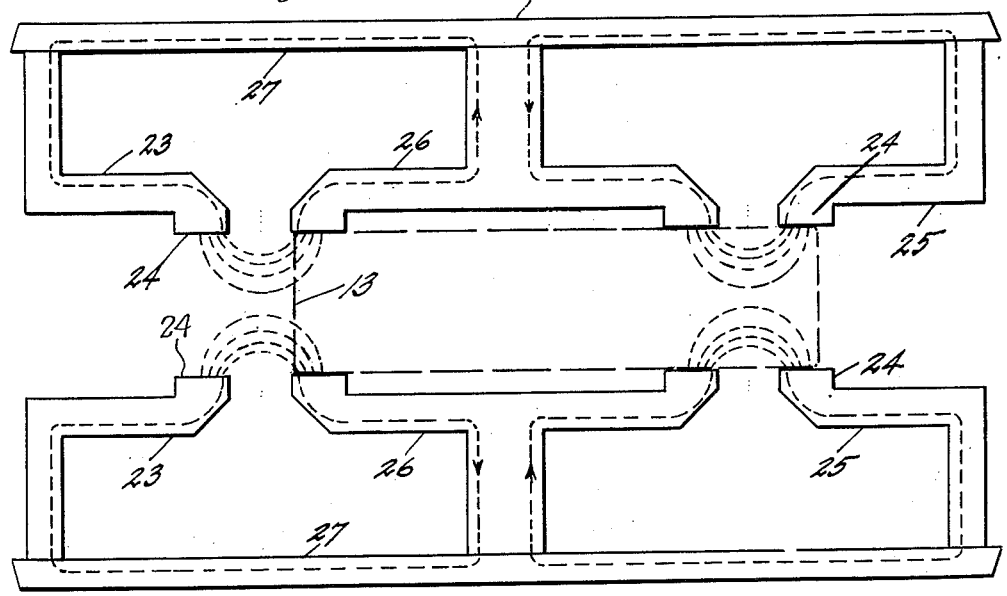
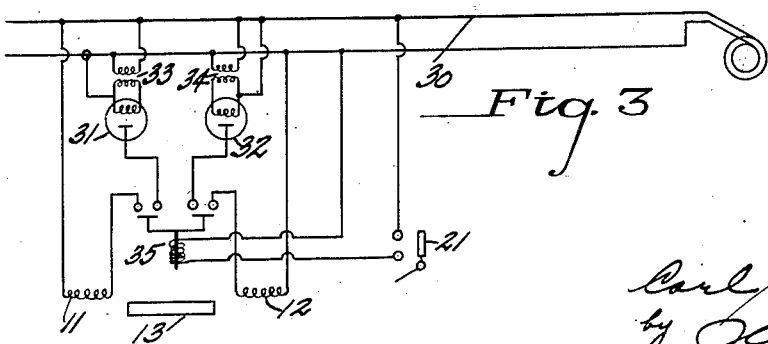

July 24, 1928.
C. S. WEYANDT
1,678,278
RECIPROCATING ELECTRIC MOTOR
Filed May 2, 1924
2 Sheets-Sheet 2
Fig. 4
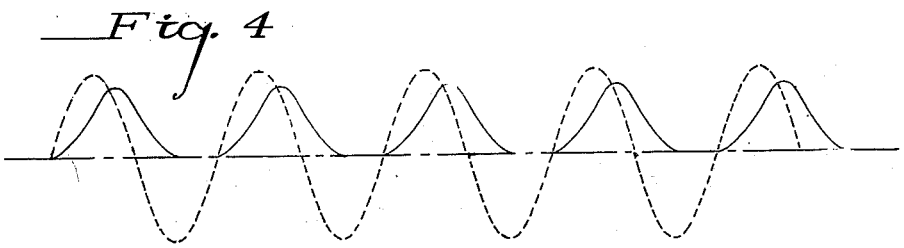
Fig. 5
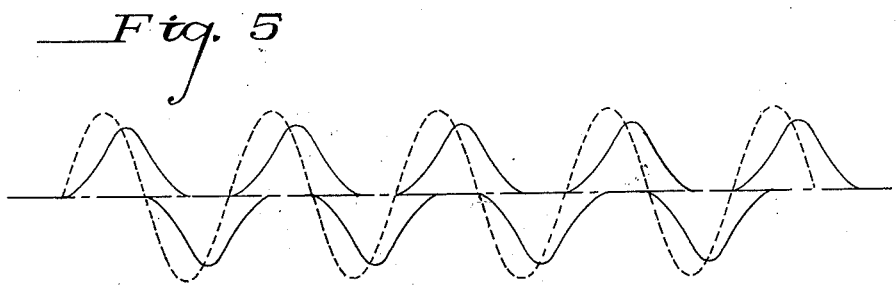
Fig. 6
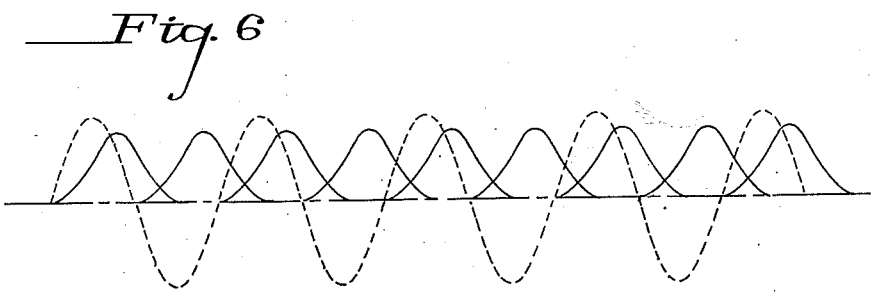
Fig. 1ᵃ
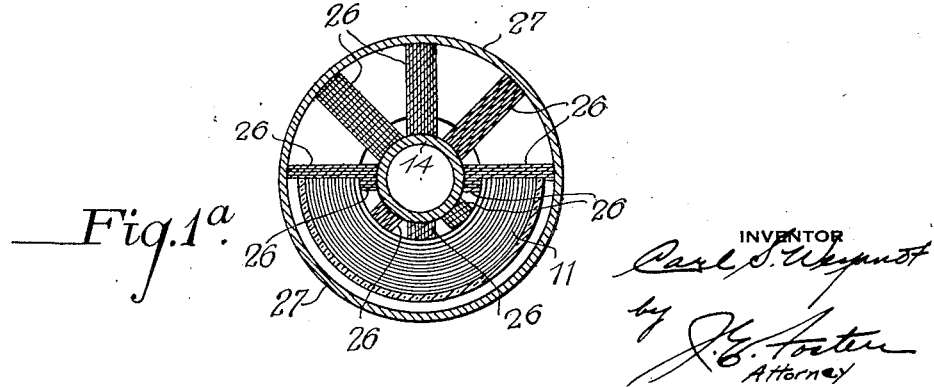
INVENTOR
Carl S. Weyandt
by J. C. Foster
Attorney Patented July 24, 1928.

1,678,278

UNITED STATES PATENT OFFICE.

CARL S. WEYANDT, OF PITTSBURGH, PENNSYLVANIA, ASSIGNOR TO CENTRAL ELECTRIC TOOL COMPANY, A CORPORATION OF PENNSYLVANIA.

RECIPROCATING ELECTRIC MOTOR.

Application filed May 2, 1924. Serial No. 710,501.

This invention relates to reciprocating electric motors of the type employed as percussive tools or electric hammers for doing work such as drilling and chipping stone and concrete and work of similar nature.

The object of my invention is to provide a novel magnetic structure for a motor of the reciprocating type comprising two operating windings and a movable core responsive thereto, whereby the restraining effect of one winding may be diminished or eliminated when the other winding is energized to actuate the core member.

Another object of my invention is to provide a magnetic structure for an electric hammer of the above indicated character that shall render the hammer rigid, and rugged in construction.

In controlling an electric motor of the reciprocating type embodying two operating windings and a movable core responsive thereto, energy impulses are alternately supplied to the respective windings to cause them to operate alternately upon the core member to move it in opposite directions. The core member is thereby actuated in synchronism with the energy impulses supplied to the windings and when properly disposed relative to a working tool, will cause the tool to do useful work.

In my co-pending application, Serial No. 577,719 filed July 26, 1922, relating to method of operating electric tools, I have illustrated and described an electric hammer of the reciprocating motor type comprising two windings and a core responsive thereto. I have also shown a preferred system for effecting alternate energization of the windings, comprising two electron bulbs properly connected between the windings and an alternating current circuit to transmit current waves of predetermined polarity in alternate sequence to the respective windings. By reason of such alternate energization, the windings effect reciprocating motion of the core member to act upon a tool to do useful work.

By reason of asymmetric conductivity of the electric valves employed in the foregoing system, and the inductive character of the solenoids, the duration of the energizing impulses traversing each solenoid involves an interval of the order of 270 electrical degrees. Since the beginning of each current impulse corresponds to the beginning of the voltage wave or half cycle of the polarity that causes current conduction in the valve transmitting such impulse, the current impulses in both solenoids are active during overlapping intervals. The current traversing the solenoid which has been disconnected from the source of energy, which will be referred to as the de-energized solenoid, continues after the polarity of the source has changed, by reason of the restoration of the energy stored in the magnetic field of the solenoid to the circuit including the solenoid. During the interval of restoration in the de-energized solenoid current traverses the other solenoid, which is at that time connected to the source and is developing a magnetic flux. Thus the magnetic flux of the deenergized winding is collapsing while that of the energized winding is developing. A magnetic restraining force due to the collapsing flux of the de-energized solenoid is therefore exerted upon the movable core for a short interval in opposition to the force exerted on the core by the actuating flux which during that short interval is being developed by the energized or active solenoid.

In the hammer which I have illustrated in the application referred to above, I have provided separate magnetic circuits for the respective windings. The metal used in the magnetic circuit members associated with the windings consists of silicon steel. It is highly magnetic but has low retentivity. Other parts of the hammer, however, require heat treatment and hardening and are therefore made of tool steel which is highly magnetically retentive. The tools that are used with the hammer, such as drills, rivet sets and the like, are also made of tool steel. The other parts of the hammer made of tool steel, comprise a bushing or guide for the tools and a backstop for the reciprocating core member. These parts are necessarily adjacent the respective solenoids and are magnetized by leakage flux therefrom. By reason of their retentivity, such parts of the hammer and the tools retain considerable residual magnetism after the associated winding is de-energized and the other winding is energized to actuate the core member. Such residual magnetism in the tool or tool steel parts adjacent the de-energized winding tends to restrain, to some extent, the actuation of the core member by the other winding. Considerably more energy is therefore required to actuate the core member by reason of the restraining effects of the decreasing flux and the residual magnetism of the parts adjacent the de-energized winding than would be necessary if such residual effects were not present.

It is the object of my invention to diminish the restraint due to the collapsing flux and to eliminate that due to residual magnetism.

In seeking to avoid the detrimental effects of the residual magnetism retained in the magnetic circuit members and in the tool steel parts adjacent the de-energized winding, I have found that by utilizing the flux which is being developed by the energized winding to neutralize the residual magnetism due to the de-energized winding, the restraining effect is diminished and eliminated very rapidly at the time when the energized winding is building up a magnetic field to actuate the core member. The restraining effect of the residual magnetism associated with the de-energized winding is thus substantially eliminated before the magnetic force of the energized winding attains the strength or value that is sufficient to actuate the core member. By interlinking the magnetic circuits associated with the two windings, the flux being developed by the energized winding may be caused to neutralize the residual flux in the magnetic circuit associated with the de-energized winding and the restraining force of such residual magnetism will thereby be eliminated.

By disposing the magnetic circuits associated with the respective windings to neutralize the effect of the residual magnetism of each winding, I have been able to increase the efficiency of an electric hammer embodying my present invention between 10 and 15% over that previously attained.

In practicing my invention I dispose two solenoids on a tube or barrel of non-magnetic material and dispose a movable core within the barrel that shall be responsive to the respective solenoids. A magnetic structure is disposed around the solenoids comprising a plurality of sets of laminations of L-shape radially disposed around the barrel at the remote ends of the two solenoids. Similar sets of laminations are disposed around the barrel but between the solenoids at their adjacent ends. These metal laminations are of substantially inverted T-shape corresponding in form to what would be obtained by joining two members of L-shape similar to those at the outer ends of the solenoid. Each set of laminations is provided with tips or tenons that extend through the wall of the barrel to within a few thousandths of an inch from the inner surface. The laminations are thus securely fixed to the barrel and serve a two fold purpose of holding the solenoid in definite predetermined position and also of directing the flux developed by the solenoids at definite zones intermediate the ends of the respective solenoids. The flux fields that are concentrated at such zones are effective to actuate the core member in one direction or the other depending upon which of the fields is energized.

The fluxes that are developed by both solenoids traverse the middle laminations. The solenoids are so connected, however, that the magneto-motive-forces produced by them oppose each other and tend to cause the fluxes to traverse the middle laminations in opposite directions. Since the windings are alternately energized, the flux that is developed by the energized winding neutralizes the residual magnetism established in the middle laminations by the de-energized winding, and in so neutralizing the residual magnetism in the middle laminations it eliminates entirely the residual magnetism of the tool steel parts adjacent the de-energized winding, and, consequently, the restraining force that might be effected thereby.

Fig. 1 of the accompanying drawings is a sectional view taken longitudinally of an electric hammer constructed in accordance with the principles of my invention;

Fig. 1ª is a section on line *a—a* Fig. 1.

Fig. 2 is an elevational view of the magnetic structure employed in the hammer in Fig. 1.

Fig. 3 is a diagrammatic view of an electric circuit for controlling the operation of the hammer in Fig. 1;

Fig. 4 is a graph illustrating the wave form of the current impulses transmitted to one winding of the hammer;

Fig. 5 is a graph illustrating a wave form of the current impulses transmitted to both windings of the hammer; and Fig. 6 is a graph illustrating the chronological disposition of the impulses transmitted to both windings to show the overlapping relationship of such impulses.

As illustrated in Fig. 1, an electric hammer 10, of the reciprocating motor type, comprises two windings or solenoids 11 and 12, a core 13 responsive thereto and movable in a guide or barrel 14 of non-magnetic material, upon and around which the solenoids 11 and 12 are disposed. The windings 11 and 12 are adapted to be alternately energized to reciprocate the core member 13. As the core is moved forward by the solenoid 11 it strikes the shank of a tool 15 to do useful work. When the core is moved backward by the solenoid 12, it engages a spring-cushioned backstop 16 within which it stores its kinetic energy until again moved forward by the solenoid 11. The shank of the tool 15 is maintained in proper position by a tool bushing 17 which is threaded into the front end of the barrel 14. A cap 18 is also held in place by the tool bushing 17 to close the front end of the hammer. The spring cushioned backstop 16 is held in position at the rear end of the barrel by a cap 19 which is threaded onto the rear end of the barrel. The cap 19 also serves to lock the handle 20 in position on the end of the hammer. A trigger switch 21 is disposed in the handle 20 and may be controlled by the operator to control the operation of the of the hammer.

The shank of the tool, the tool bushing 17 and the parts constituting the spring-cushioned backstop 16, are made of tool steel which is highly magnetically retentive. Inasmuch as they are disposed adjacent the solenoids they are magnetized thereby and, due to their retentivity, they retain considerable residual magnetism which attracts the core and tends to restrain its actuation by the active solenoid.

In order to provide a highly efficient magnetic circuit for the respective windings, I dispose a plurality of laminations 23 of silicon steel of substantially L shape, radially around the front end of the barrel and adjacent the end of the solenoid. The laminations 23 are provided with tips or tenons 24 which extend through the barrel 14 to within a few thousandths of an inch from the inner surface of the barrel. Similar laminated members 25 are disposed at the rear end of the barrel adjacent the solenoid 12. The laminations 25 are similarly provided with tips 24 that extend into the barrel. Between the solenoids 11 and 12 laminated members 26 of substantially inverted T-shape are disposed radially around the barrel.

The middle laminations 26 are preferably equal in size to one of each of laminations 23 and 25 placed side by side. The inner laminations are also provided with tips 24 similar to those of the end laminations 23 and 25 and cooperate with the tips of the end laminations to concentrate the magnetic fluxes developed by the solenoids within annular zones intermediate the ends of the solenoids. A tube or casing 27 fits tightly over the laminations to provide a closed magnetic circuit for the respective solenoids, and also provides a protective covering for the windings. The solenoid windings are insulated from the laminations by layers of suitable insulating material 28.

By reason of the highly permeable characteristics of the laminated circuit, the residual magnetism of the tool steel parts is easily retained.

The operation of the hammer is controlled as illustrated in Fig. 3. Energy is derived from an alternating current supply circuit 30 and supplied to the respective windings 11 and 12 through two electric valves 31 and 32 respectively. The valves 31 and 32 are of the two element type comprising an electron-emitting filament and a plate which are effective to transmit current only when the plate is positive with regard to the filament. Energy for rendering the filaments of the respective valves 31 and 32 incandescent is derived from the circuit 30 through transformers 33 and 34 respectively.

When operation of the hammer is desired the operator closes the trigger switch 21 which completes the circuit to energize a relay 35. The relay 35 thereupon operates to connect the winding 11 to the circuit 30 through the valve 31 and to connect the winding 12 to the circuit 30 through the valve 32. It will be noted the filaments of the two respective valves are connected to different conductors of the supply circuit and the valves will therefore be alternately effective to transmit current to the associated winding depending upon the polarity of the circuit.

For example, referring to Fig. 4, in which the sine curve shown in dotted line represents the supply circuit voltage, the wave impulses shown in solid line will represent the current energy impulses periodically transmitted by one of the valves which for the purpose of illustration may be taken as valve 31. It will be noted that each current wave impulse involves an interval of time corresponding to approximately 270 electrical degrees. The duration of such time interval is due to the transmission of current through a valve during the interval of 180 electrical degrees while the conductor connected to the filament is negative and is further due to the current caused to traverse the winding when the energy stored in the magnetic field of the solenoid is returned to the circuit by and during collapse of the field.

In Fig. 5 are illustrated the current waves that alternately traverse the solenoids 11 and 12. Thus the wave impulses shown in solid line above the base line may be regarded as traversing the solenoid 11 and the impulses illustrated in solid line below the base line as traversing the winding 12. Upon translating the wave impulses below the base line to corresponding positions above the base line, as illustrated in Fig. 6, it becomes apparent that the ends of the current waves in one solenoid overlap the beginnings of the current waves in the other solenoid.

By considering Fig. 2 and Fig. 6 together, it becomes apparent that the fluxes developed by the currents traversing the respective solenoids will traverse the middle laminations 26 at the same time for the duration of the overlapping intervals.

While the flux is collapsing or decreasing in one magnetic circuit, it is being developed or is increasing in the other magnetic circuit. Since the windings are so connected that the two fluxes traverse the middle laminations in opposite directions, a developing flux tends to increase the rapidity of collapse of a decreasing magnetic flux. Any tendency which the flux of the de-energized winding might have to restrain the operation of the core is thereby diminished. Moreover, the developing flux, being opposite in direction to the residual flux of the tool steel parts, tends to increase the reluctance of the middle laminations to the residual flux and thereby eliminates it entirely. The restraining effect of the residual flux upon the core is thus eliminated.

In a hammer of the type heretofore constructed, the magnetic circuits of the two solenoids have been separate and the flux developed by one solenoid has had no influence upon the residual or collapsing flux of the other solenoid. All counter-action between actuating and restraining forces had to be effected through the core itself. In the present construction, however, the restraining forces are all modified and counteracted outside of the core and less operating energy is therefore required.

For example, since the magnetic circuit of a de-energized or inactive solenoid is closed by the core, as illustrated in Fig. 2, when the energized or active solenoid begins to develop its flux, a greater force would be required by the active solenoid to actuate the core if the magnetic circuits were separate and the developing flux of the active solenoid could not affect or influence the residual magnetism to diminish its restraining attraction on the core. In the present arrangement, however, the residual flux is counteracted and the advantages of a closed circuit in restraining the core are eliminated and the operating force necessary in the active solenoid is lessened.

The disposition of the middle laminations 26 between the two solenoids as an element common to the magnetic circuits of both solenoids, and the energization of the solenoids in such direction as to cause the respective fluxes thereof to traverse the middle laminations in opposite directions thus eliminate restraining forces on the core member and increase the efficiency of the hammer.

The following experimental data illustrate the effectiveness of a common middle lamination in diminishing the current necessary in the active solenoid to actuate the core when the fluxes oppose. A direct current of the value in column A was caused to traverse one solenoid as in actual operation. The core completed the magnetic circuit associated with the solenoid. After the circuit of the first solenoid was opened, a current of the value represented in column B was required in the other solenoid to actuate the core when the flux of that solenoid was caused to traverse the middle lamination in the same direction as that of the first solenoid. When the second solenoid was so energized as to cause its flux to traverse the middle laminations in direction opposite to that of first solenoid, a current of the value represented in column C was required in the second solenoid to actuate the core.

| Fluxes traverse middle lamination in same direction | | Fluxes traverse middle lamination in opposite direction | |
|---|---|---|---|
| A | B | A | C |
| 5 | 2.9 | 5 | 2 |
| 4 | 2.85 | 4 | 1.85 |
| 3 | 2.85 | 3 | 1.85 |
| 2 | 2.80 | 2 | 1.85 |
| 1 | 2.75 | 1 | 1.8 |
| 0 | 1.85 | 0 | 1.35 |

It will be observed that a lesser current is required to actuate the core when the fluxes traverse the middle laminations in opposite directions, since in that case the developing flux eliminates the residual magnetism, whereas when the fluxes traverse the middle laminations in the same direction, they have no mutual influence upon each other, and the residual flux is effective to restrain the core.

A second experiment showed further the effectiveness of the employment of a common lamination in which the fluxes opposed.

| Current in solenoid #1 | Direction of fluxes in middle lamination | Current in solenoid #2 |
|---|---|---|
| 0.5 amp. | Same. | 6.0 amp. |
| 0.3 amp. | Same. | 5.0 amp. |
| 0.5 amp. | Opposite. | 4.5 amp. |
| 0.3 amp. | Opposite. | 3.35 amp. |

While the currents represented in the first column traversed solenoid #1, the currents represented in the last column were required to actuate the core depending upon the direction of the fluxes of the two solenoids. When the fluxes opposed, the current required in the second solenoid was less. Here again the actuating current necessary is less when the fluxes oppose.

By means of the lamination common to the magnetic circuits of both solenoids, and the energization of the solenoids to cause their fluxes to oppose in the common lamination, the efficiency of the hammer is considerably increased. The counteraction of the forces of the two solenoids is thus effected outside of the core itself, whereas in the previous structures where the magnetic circuits were separate, such counteraction was effected through the core itself.

The single middle laminations employed in a hammer of the present type are also structurally beneficial since the rigidity of the magnetic structure is increased to make the hammer a compact unit.

My invention is not limited to the specific construction of the various elements but may be modified in the spirit and scope of my invention as set forth in the appended claims.

I claim:

1. In a reciprocating motor, the combination with two separate windings and a movable member wholly responsive thereto, of means for alternately energizing the windings, means associated with the windings to constitute magnetic paths of low reluctance for the flux developed by the windings to actuate the movable member, said magnetic means associated with the two windings comprising a magnetic casing and a flux conducting portion common to said windings whereby the developing flux of one winding hastens the collapse of the flux of the other winding to thereby eliminate the effect of residual magnetism tending to restrain the movable member against actuation by the active winding.

2. In a reciprocating motor the combination with two solenoids adapted to be alternately energized and a movable member to be reciprocated by the solenoids in response to such energization, of a laminated structure for the solenoids to conduct the magnetic fluxes developed thereby to zones of concentration to influence the movable member, said structure comprising a laminated section constituting a common path of conduction which the fluxes developed by the solenoids traverse in opposite directions.

3. In a reciprocating motor, the combination with two separate solenoids adapted to be alternately energized and a movable core reciprocably actuable wholly by the solenoids in response to such energization, magnetic means whereby the solenoids may concentrate intermediate their ends, their respective fluxes upon the core, and an element commonly situated with respect to both solenoids and disposed in such relation to the magnetic means associated with the solenoids that the total fluxes developed by the solenoids will traverse the common element.

4. In a reciprocating motor provided with two operating windings and a common core movable in response thereto, of means for diminishing the influence of one winding upon the core, by reason of residual magnetism, when the other winding is energized to actuate the core, said means comprising a magnetic element common to the magnetic circuits of both windings and said element having opposite portions adjacent comparatively narrow air gaps of the respective magnetic circuits.

5. In a reciprocating motor, the combination with two solenoids and a movable core responsive thereto, of a magnetic structure enclosing the solenoids comprising end laminations radially disposed around the solenoids to bound the solenoids, and middle laminations radially disposed between the solenoids to separate them and to provide a common path for the magnetic fluxes of the two solenoids, said end and middle laminations constituting two channel spaces for accommodating the respective solenoids.

6. In a reciprocating motor, the combination with two solenoids and a movable core responsive thereto, of a magnetic structure enclosing the solenoids comprising a magnetic casing and end laminations radially disposed around the solenoids to bound the solenoids, and middle laminations radially disposed between the solenoids, to separate them and to provide a common path for the magnetic fluxes of the two solenoids, said end and middle laminations constituting two channel spaces for accommodating the respective solenoids, and means associated with the laminations to anchor them in predetermined positions.

7. In a reciprocating motor, the combination with two solenoids and a movable core responsive thereto, of a magnetic structure enclosing the solenoids comprising a magnetic casing and end laminations radially disposed around the solenoids to bound the solenoids, and middle laminations radially disposed between the solenoids to separate them and to provide a common path for the magnetic fluxes of the two solenoids, said end and middle laminations constituting two channel spaces for accommodating the respective solenoids, and means associated with the laminations to anchor them in predetermined positions and to serve to concentrate the magnetic fluxes developed by the solenoids at predetermined zones to influence the core.

8. A reciprocating electric motor comprising two solenoid windings, a movable core responsive thereto, a cylindrical tube serving as a guide for the core and as a support for the windings, laminated magnetic field members radially disposed around the tube at the outer ends of the windings to present a flux-conducting path of definite area, and a plurality of similarly laminated magnetic field members radially disposed around the tube between the inner ends of the windings, each of said last named laminations comprising a portion extending into each of the associated windings to a zone intermediate the ends thereof to concentrate the developed flux in such zone, and tips associated with some of said laminations for securing them to the tube to lock the laminations and the windings in place.

9. In a reciprocating motor system the combination with two solenoid windings, a movable core responsive thereto and an alternating current source of energy therefor, of an electric valve disposed between each winding and the circuit to transmit current wave impulses to the respective windings alternately, and magnetic field members associated with the windings to concentrate a magnetic actuating flux upon the core, said members comprising a portion common to the magnetic circuits of both windings at a zone traversed by the flux fields in opposite direction whereby the flux being developed by an active winding eliminates the residual flux of the other winding tending to restrain the core against actuation by the active winding.

10. A structure for a reciprocating electric motor provided with two solenoids and a core responsive thereto, comprising a barrel serving as a guide for the core and as a support for the solenoids, a plurality of laminations of substantially L-shape radially disposed around the barrel at opposite ends thereof and provided with tenons extending into and tightly secured to the barrel, a plurality of laminations of substantially inverted T-shape similarly disposed around the barrel intermediate the L-shape members and similarly provided with tenons for securing the T-shape members to the barrel, the laminated members being disposed to constitute two channels for accommodating the solenoids, and a tube of magnetizable material for enclosing the solenoids and closely engaging the laminated members to complete the magnetic circuits thereof.

11. Reciprocating motor mechanism comprising two solenoids, a movable magnetizable member responsive thereto, magnetic circuit members associated with the respective solenoids including members common to the magnetic circuits of both solenoids and provided with comparatively narrow air gaps adjacent each solenoid to be bridged by the movable member, and means for alternately supplying current to the respective solenoids to cause the respective fluxes developed thereby to traverse the common magnetic circuit members in opposite directions.

12. In an electric tool, a non-magnetic barrel, a tool shank at one end of the barrel, a core stop at the other end thereof, two axially aligned windings surrounding the barrel, magnetic field members arranged around the barrel and within the windings, the field members being interrupted to form short air gaps within the length of each winding, said field members having a common portion for the passage of flux therethrough and a magnetic core reciprocatory in the barrel and having its ends arranged to be drawn into the air gap alternately by alternate energization of the windings.

13. An electric tool of the reciprocating motor type comprising a barrel, a core movable therein, two solenoids disposed around the barrel, magnetic field members comprising limiting portions for holding the solenoids in position and locking portions fitting into the barrel, the magnetic field structure including members common to the solenoids so that the developing flux of one solenoid winding may oppose and neutralize the decaying flux of the other winding.

14. An electric tool comprising a reciprocating magnetizable core, a plurality of groups of circumferentially spaced and outwardly extending laminæ disposed along the path of said core. a plurality of axially aligned windings, each positioned between adjacent groups of laminæ, said laminæ having portions common to the windings so that the flux of one coil will oppose the flux produced by the opposite coil when the energizing field is reversed, and a casing of magnetizable material enclosing said windings and engaging the radial extensions of the outwardly extending laminæ which project beyond the outer periphery of the windings.

15. A percussive tool of the reciprocating electric motor type comprising front and rear solenoids, a magnetizable core structure actuated by said solenoids, laminated field members for concentrating the magnetic flux produced by each solenoid in an air gap within the length of the solenoid, certain of said field members having portions common to both solenoids, and last named members comprising a leg member having two oppositely disposed portions with pole tips thereon.

16. A percussive tool of the reciprocating electric motor type comprising two solenoids, a magnetizable core structure actuated by said solenoids, laminated field members for concentrating the magnetic flux produced by each solenoid in an air gap within the length of the solenoid, said field structure including laminations common to each solenoid and having oppositely extending portions thereon, said portions terminating in pole tips adjacent the respective air gaps.

17. An electric tool of the reciprocating motor type comprising a barrel, a core movable therein, two solenoids disposed around the barrel and magnetic field structure for holding the solenoids in position including portions common to both solenoids, said portion having locking portions fitting into the barrel and forming pole tips therein.

18. A reciprocating motor comprising a movable magnetizable core, two field windings for effecting reciprocation of said core, groups of magnetizable elements forming magnetic circuits for said windings, certain of said elements being common to the different magnetic circuits of said windings, and means for energizing said windings in succession and in such senses as to produce in said common elements successive magnetic fluxes in opposite directions.

19. A reciprocating motor comprising a magnetizable core, two field windings for reciprocating said core, a plurality of groups of magnetizable elements providing different magnetic circuits for the respective windings, one of said groups of magnetizable elements having portions common to said windings and their respective magnetic circuits, and means for energizing said windings in succession, said windings being so connected that an increasing flux in one of said magnetic circuits will oppose and neutralize the decadent flux in the other within said common portions.

20. The combination with a reciprocating motor comprising two solenoids, a reciprocating core actuated in one direction by one of said solenoids and in the opposite direction by the other, and stationary magnetic core structure common to the magnetic circuits of said solenoids and adapted to concentrate the flux of said solenoids in a region intermediate their ends respectively, of a source of alternating current, and means for directing through said solenoids alternately unidirectional current impulses derived from said source to produce magneto-motive forces which oppose each other with respect to said common core structure.

21. The combination with a reciprocating motor comprising two solenoids, a reciprocating core actuated in one direction by one of said solenoids and in the opposite direction by the other, and stationary magnetic core structure common to the magnetic circuits of said solenoids and adapted to concentrate the flux of said solenoids in a region intermediate their ends respectively, of a source of alternating current, and electric valves so connected to said source of alternating current as to direct through said solenoids alternately unidirectional current impulses derived from said source to produce magneto-motive forces which oppose each other with respect to said common core structure.

22. The combination with a source of alternating current, a reciprocating motor comprising two solenoids, electric valve structure through which said solenoids are alternately energized from said source, and a magnetic core adapted to be actuated in one direction by one of said solenoids and in the opposite direction by the other, of field structure forming magnetic circuits for the solenoids, said solenoids being connected in circuit in such sense with respect to each other that the magnetic flux set up in that portion of said magnetic circuits common to them is opposed in direction by the succeeding flux set up in said portion by another of said solenoids.

23. The combination with an alternating current source, a reciprocating motor comprising two solenoids adapted to be alternately energized, asymmetrical conductors connected between said source and said motor, and a magnetic core adapted to be actuated in one direction by one of said solenoids and in the opposite direction by the other, of field structure forming magnetic circuits for the solenoids, said solenoids being connected in circuit in such sense with respect to each other that the magnetic field set up by current traversing one of said solenoids tends to neutralize and oppose the decaying field of the other solenoid.

24. The combination with an alternating current source, a reciprocating motor comprising two solenoids adapted to be alternately energized, asymmetrical conductors connected between said source and said motor for supplying overlapping current impulses thereto, and a magnetic core adapted to be actuated in one direction by one of said solenoids and in the opposite direction by the other, of field structure forming magnetic circuits for the solenoids, said solenoids being connected in circuit in such sense with respect to each other that the magneto-motive forces set up by alternate energizations of said solenoids produce in the core magnetic fluxes in the same direction for both directions of movement of the core.

In testimony whereof, I have hereunto subscribed my name this 22nd day of April, 1924.

CARL S. WEYANDT.

CERTIFICATE OF CORRECTION.

Patent No. 1,678,278. Granted July 24, 1928, to

CARL S. WEYANDT.

It is hereby certified that error appears in the printed specification of the above numbered patent requiring correction as follows: Page 1, line 69, after the word "solenoid" insert a comma; page 6, line 102, claim 15, for the word "and" read "said"; page 7, line 21, claim 20, for "notor" read "motor"; and that the said Letters Patent should be read with these corrections therein that the same may conform to the record of the case in the Patent Office.

Signed and sealed this 3rd day of December, A. D. 1929.

(Seal)

M. J. Moore,
Acting Commissioner of Patents.